United States Patent [19]

Rundle

[11] Patent Number: 4,698,048
[45] Date of Patent: Oct. 6, 1987

[54] VARIABLE SPEED TRACTOR TRANSMISSION AND SINGLE LEVER CONTROL

[76] Inventor: Kenneth P. Rundle, 8304 Brookside Rd., Independence, Ohio 44131

[21] Appl. No.: 848,228

[22] Filed: Apr. 4, 1986

Related U.S. Application Data

[63] Continuation-in-part of Ser. No. 723,650, Apr. 16, 1985, abandoned.

[51] Int. Cl.[4] .............................................. F16H 11/04
[52] U.S. Cl. .................................. 474/27; 74/473 R; 56/11.1
[58] Field of Search ....................... 474/25–27, 474/101, 109; 74/473 R, 372; 56/11.1, 11.6

[56] References Cited

U.S. PATENT DOCUMENTS

| | | | |
|---|---|---|---|
| 874,563 | 12/1907 | Boulanger | 74/372 |
| 2,235,122 | 3/1941 | Shaw | 474/27 |
| 2,689,484 | 9/1954 | Phares | 474/27 |
| 2,772,652 | 12/1956 | DuShane et al. | 74/473 X |
| 2,775,134 | 12/1956 | Swenson | 74/473 R |
| 3,433,087 | 3/1969 | Winter et al. | 74/473 R X |
| 3,457,797 | 7/1969 | Ashton et al. | 474/27 |
| 3,759,342 | 9/1973 | Plamper | 474/27 X |
| 3,777,585 | 12/1973 | Plamper | 474/27 |
| 4,176,560 | 12/1979 | Clarke | 474/27 |
| 4,524,635 | 6/1985 | Hulin et al. | 74/473 R X |

FOREIGN PATENT DOCUMENTS

| | | | |
|---|---|---|---|
| 0599580 | 10/1925 | France | 474/27 |
| 2033501 | 5/1980 | United Kingdom | 74/473 R |

*Primary Examiner*—Stephen J. Novosad
*Assistant Examiner*—Thuy M. Bui

[57] ABSTRACT

A drive mechanism for a small tractor combines a variable speed V-belt transmission with a forward-reverse gear transmission wherein both transmission are controlled by natural movement of a single control lever within a gate means. An optional second forward range of speeds is also engaged by this same single lever. The normal range of ratios afforded by a two V-belt variable speed transmission is extended by an automatic "overdrive" means that also replaces any belt tension maintenance means.

4 Claims, 12 Drawing Figures

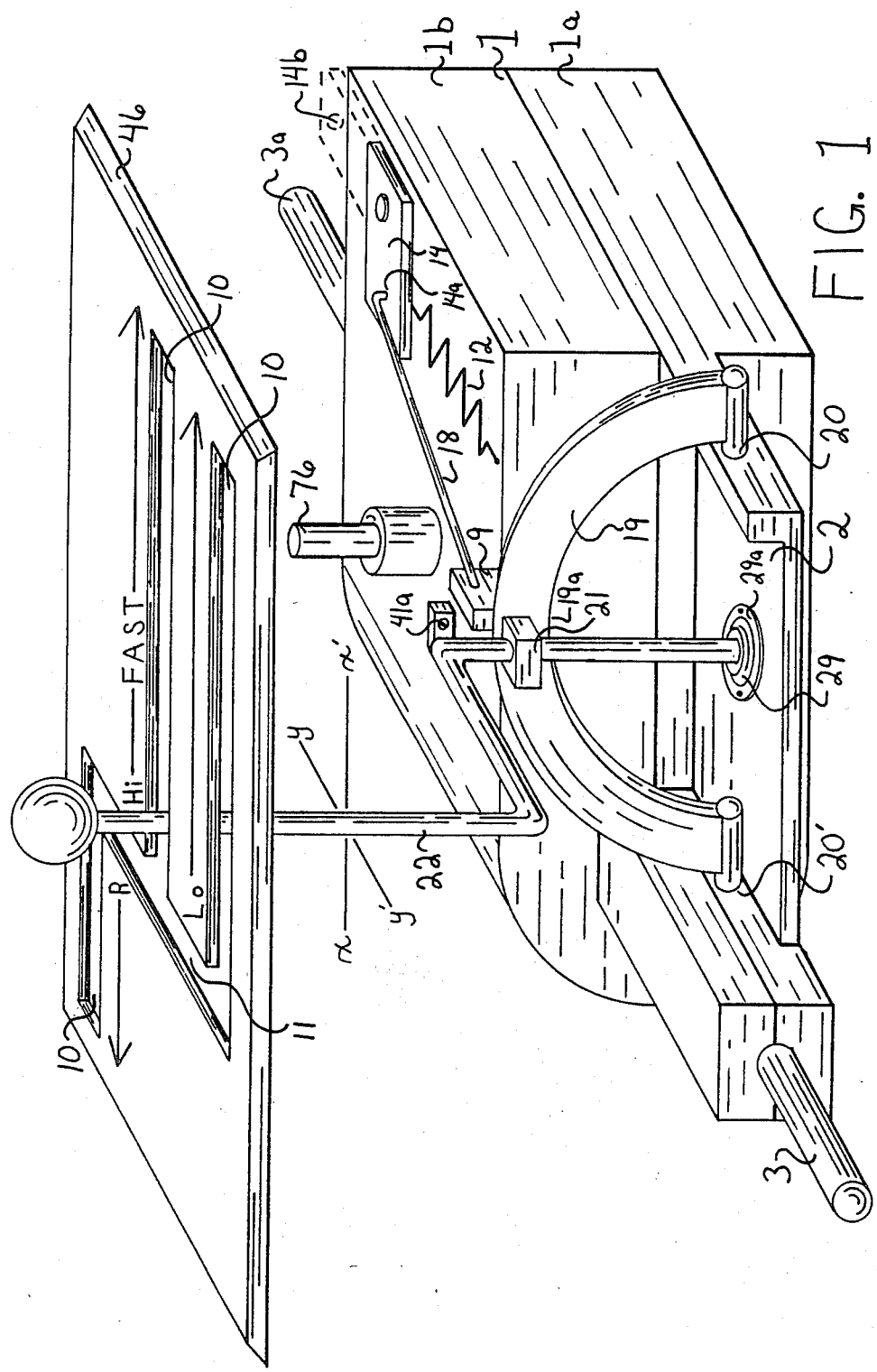

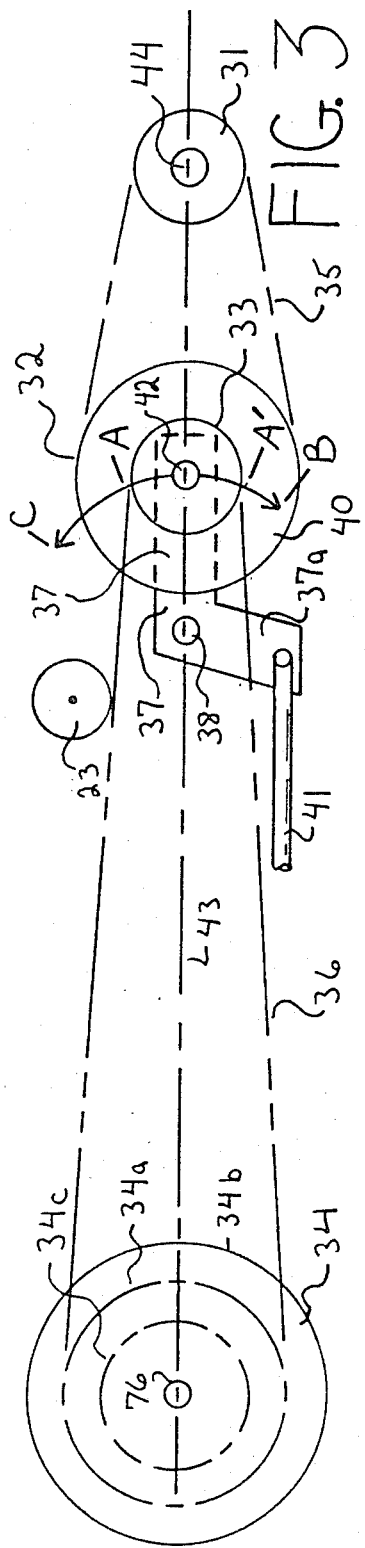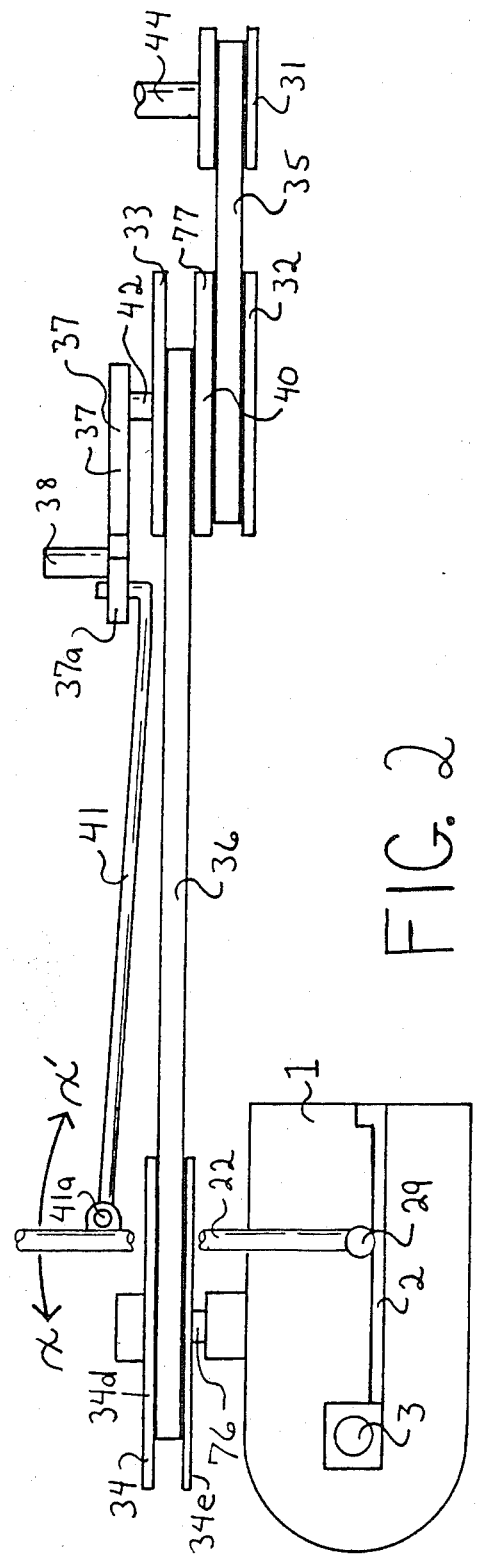

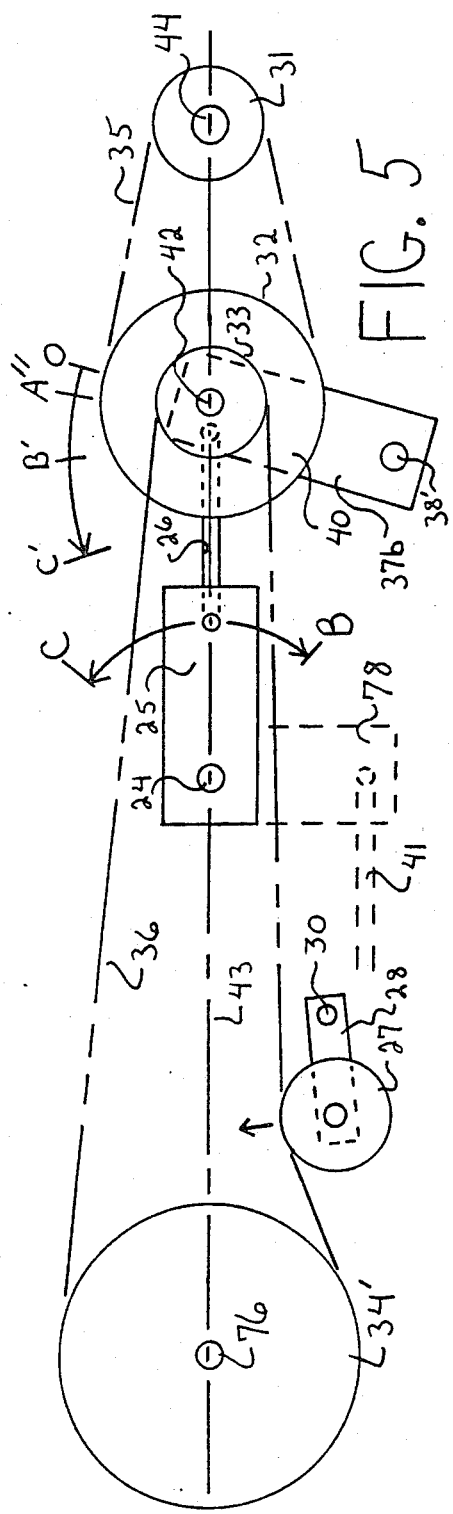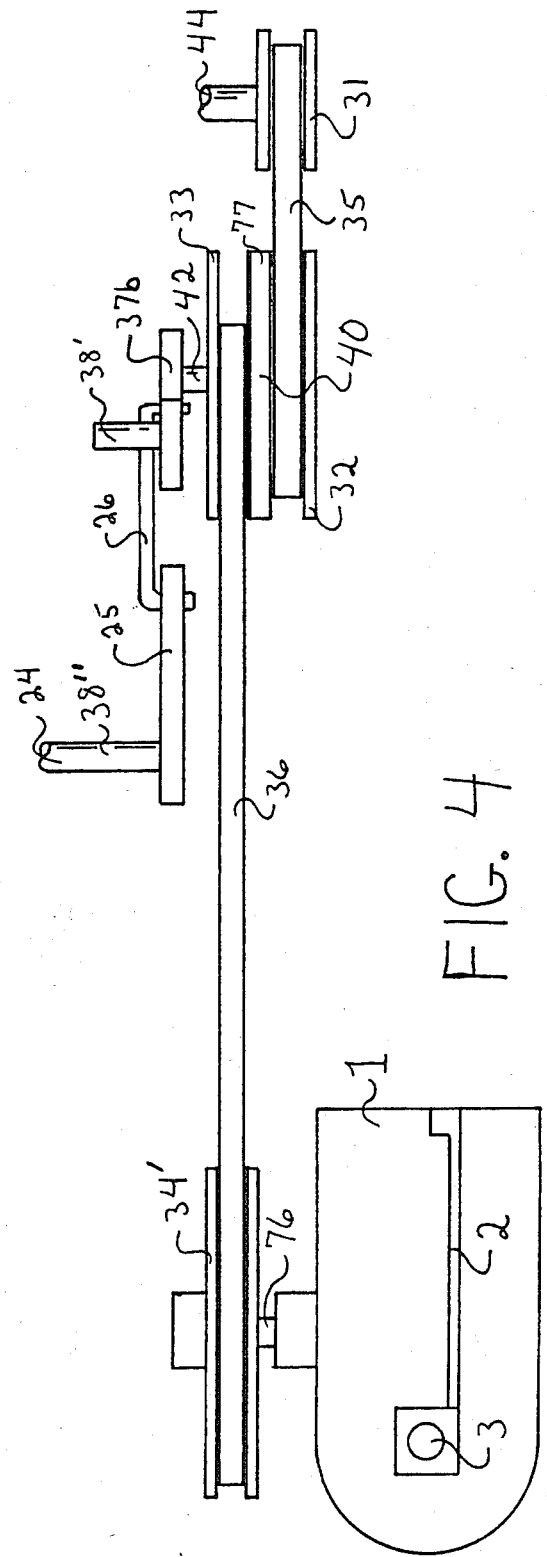

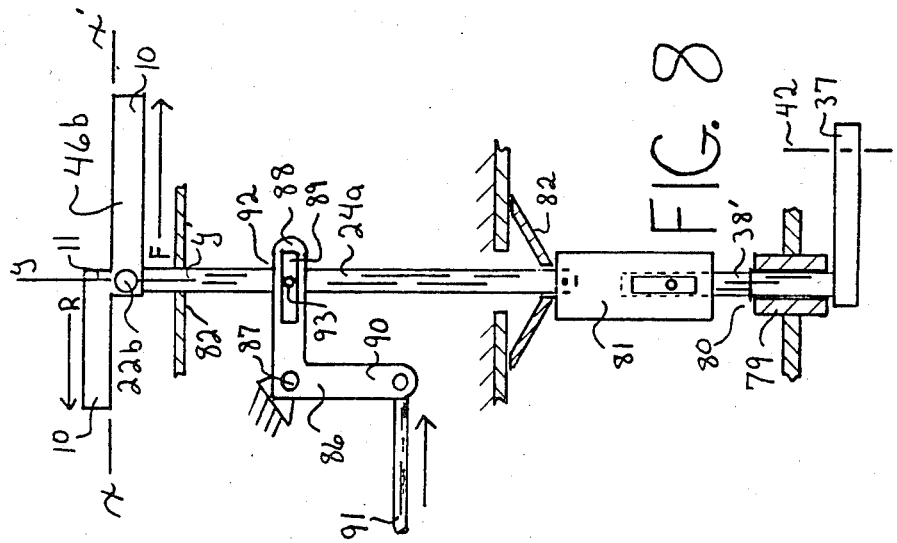
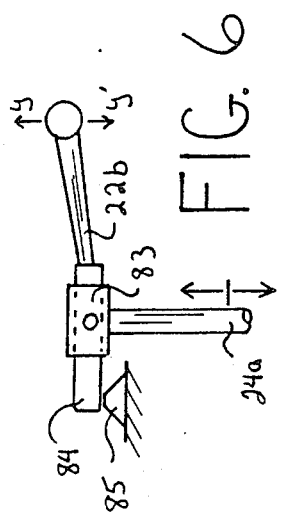
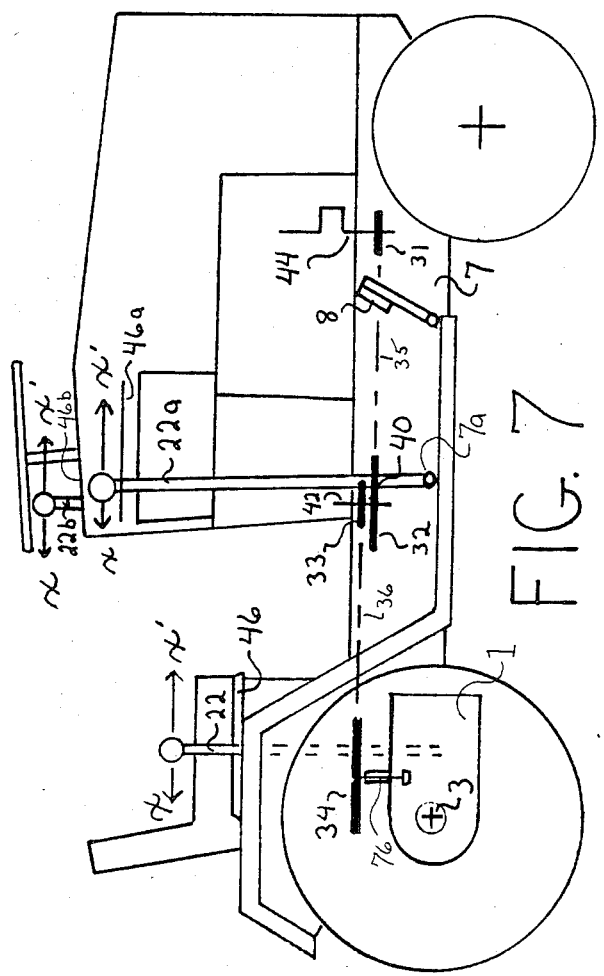

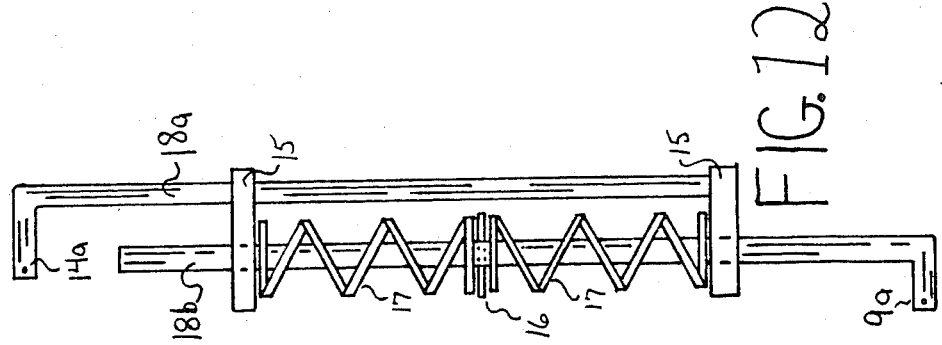
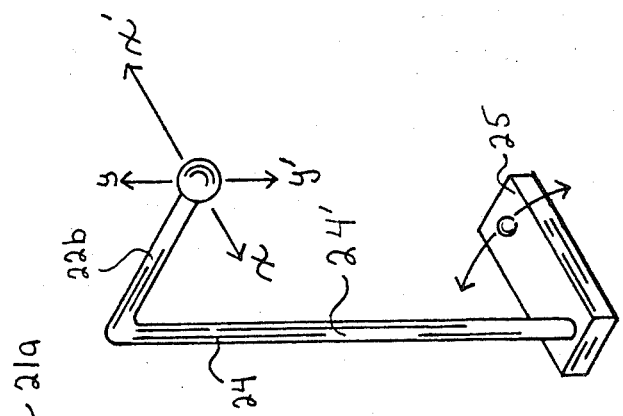
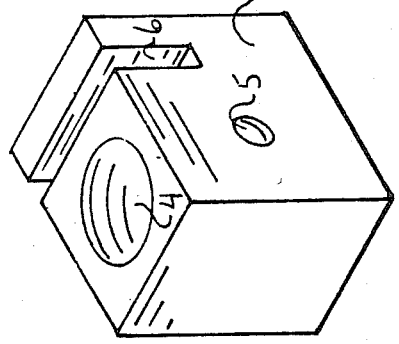
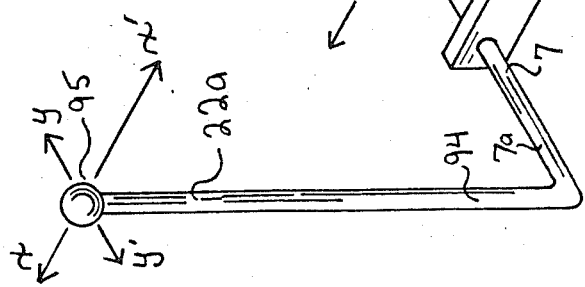

VARIABLE SPEED TRACTOR TRANSMISSION AND SINGLE LEVER CONTROL

This application is a CONTINUATION - IN - PART of the copending application Ser. No. 723,650, filed Apr. 16, 1985, entitled "WIDE RANGE TRACTOR TRANSMISSION" and now abandoned.

This invention relates to a gear type transmission that provides a reverse and one or two forward speed ranges in combination with a variable speed V-belt transmission.

A single control lever, movable within a gate means in a y-y' plane, engages the desired forward or reverse speed range at the gear transmission.

A progressive forward movement of said lever in an x-x' plane, perpendicular to said y-y' plane, engages and then advances said V-belt transmission in a forward speed range.

A progressive rearward movement of said lever, generally in said x-x' plane, engages and then advances said V-belt transmission in a reverse speed range.

An improvement to the variable speed V-belt transmission will expand the range of ratio of said V-belt transmission.

BACKGROUND OF THE INVENTION

Currently the industry desires a low cost, variable speed, reversing transmission with high torque capacity and smooth single lever control to drive small tractors presently driven hydrostatically. Many manufacturers have joined variable speed V-belt transmission with gear speed transmissions to drive their tractors, but these drives require two separate control means. The new invention shows a single lever control means that serves both the speed transmission and the variable speed transmission so that the vehicle may be shuttled effortlessly between one or more forward speed ranges and a reverse speed range by a familiar movement of this one control lever.

SUMMARY OF THE INVENTION

An object of the invention is to show a variable speed V-belt transmission in combination with a gear range transmission, both controlled by movement of a single control lever.

Another object of the invention is to show an improvement to these variable speed V-belt transmissions to expand the range of ratios provided.

BRIEF DESCRIPTION OF THE DRAWINGS

The invention will be described by way of example, with reference to the accompanying drawings, in which:

FIG. 1 is an oblique perspective of a gear speed transmission/transaxle showing the single control lever and shift linkage of the preferred embodiment.

FIG. 2 is a somewhat schematic representation of a V-belt transmission in right side view. (The preferred embodiment)

FIG. 3 is a schematic representation of the V-belt transmission of FIG. 2 in bottom view.

FIG. 4 is a somewhat schematic representation of an alternate V-belt transmission in right side view.

FIG. 5 is a schematic representation of the V-belt transmission of FIG. 4 in bottom view.

FIG. 6 is a rear view of alternative control lever 22b (FIG. 7) as employed with the V-belt transmission of FIGS. 2 and 3.

FIG. 7 is a somewhat schematic representation of a small tractor in right side elevation showing the relation of components that comprise the invention. Three alternative locations for the single control lever are shown at 22(preferred), 22a, 22b.

FIG. 8 is a right side view of lever 22b of FIG. 6 and linkages.

FIG. 9 is an isometric perspective of an alternative bearing 21 (FIG. 1).

FIG. 10 is an isometric perspective of the alternative control lever 22a (FIG. 7) and linkage.

FIG. 11 is an isometric perspective of the alternative control lever 22b (FIG. 7) and linkage as used with the V-belt transmission of FIGS. 4 and 5.

FIG. 12 represents an alternative "giving link" 18 (FIG. 1).

A direction to the right of FIGS. 1-5, and 7-10 are referred to as forward.

DESCRIPTION OF DRAWING SEVEN

Referring to FIG. 7. The small tractor illustrated shows the general relation of the variable speed V-belt transmission and the gear drive transmission/transaxle 1. The V-belt transmission is comprised of a driver sheave 31, nonrotatable on a vertical engine crankshaft 44, a double sheave variator 40, rotatable on a spindle axle 42, and a driven sheave 34 nonrotatable on transaxle 1 input shaft 76, and first and second V-belts 35 and 36. The exact details of this V-belt transmission will be explained later.

The FIG. 7 also shows three alternative locations for the single control lever. The location 22 at a right fender console is preferred. The right cowl location 22a and dash panel location 22b will also be described later. All three locations include a gate means 46, 46a, 46b as will be explained and all three levers are movable in the x-x' plane. Movement from the neutral position shown, toward x', produces a progressively faster forward travel speed, and movement toward x produces a progressively faster reverse travel speed.

DESCRIPTION OF DRAWING ONE

Referring to FIG. 1. A small tractor transaxle 1 is described in U.S. Pat. No. 4,480,501. (von Kaler). A lower case 1a and an upper cover 1b enclose one or more forward speed drives and a reverse speed drive engaged by a swinging movement of shift arm 14. The transaxle 1 includes a unique sliding key clutch means (described in U.S. Pat. No. 3,812,735 von Kaler et al) so that the arm 14 may be moved to any speed drive position regardless of alignment state inside at these clutch means.

The transaxle 1 also includes reduction gearing and a differential. Input is at shaft 76 and output is at axle shafts 3,3a which carry the tractor driving wheels.

A porch 2 has been added to the case casting 1a to support the new vehicle control means. A single control lever 22 has a ball 29 (typically of nylon) attached with a roll pin at a lower end. This ball 29 fits a socket cast into porch 2 and is secured loosely there by a bolted flange 29a. The socket may include a keyway to receive end portions of the roll pin so that the lever 22 may be moved in the x-x' and y-y' planes but may not be rotated in the socket.

A shift fence 19 is journalled in the porch 2 at 20, 20' so that it may swing on this axis. Fence 19 includes a bracket 9. A link rod 18 connects bracket 9 to shift arm 14 at 14a. A spring 12 will bias the arm 14 toward the fence 19 and toward a low forward speed position. The lever 22 has a bearing 21 (nylon), secured with roll pin, to contact the fence 19 so that a lateral positioning of lever 22 in the y-y' plane causes the shift arm 14 to be moved to a desired speed drive position.

The lever 22 has a bracket 41a that interconnects, as explained later, with the variable speed V-belt transmission. A gate means 46 (typically of nylon) is secured to the tractor rear fender to form a shift console to the right of the operator. The gate channels 10 are sized to embrace lever 22 to hold a desired position. The lateral position of lever 22 in the neutral channel 11 determines the transaxle speed drive engaged. Forward or rearward movement of lever 22 in channels 10 establishes and then advances the variable speed V-belt transmission as explained later with FIGS. 2 and 3.

The gate means 46 indicates that the transaxle 1 (shown) includes an optional low forward speed drive. A copending application Ser. No. 727,834 filed Apr. 26, 1985, by this same applicant, shows a unique gear train within a transaxle of this type to provide extreme reduction ratio for the low speed drive option.

A most typical collar shift transaxle (as shown by Clarke U.S. Pat. No. 4,176,560) may be substituted within the scope of the invention to provide single forward and reverse speed ranges. The link 18 is then best replaced by a "giving link". Referring also to FIG. 12, a first rod 18a attaches to arm 14 at 14a and has two welded brackets 15. A second rod 18b slides freely in holes in brackets 15 and attaches to fence bracket 9 at 9a. A roll pin 16 passes through rod 18b with springs 17 located as shown. The springs 17 are compressed when the lever 22 is moved to a new speed range position until alignment of the sliding collar shift means permits the actual speed drive engagement.

Referring to FIGS. 1 and 9. The FIG. 9 shows an alternative bearing 21a to replace bearing 21 (FIG. 1). Control lever 22 passes through bore 4 of bearing 21a to be secured with a roll pin passing through lever 22 and bearing 21a at 5. Bearing 21a includes a slot 6 that embraces fence 19 at 19a to more positively interconnect lever 22 and fence 19 as lever 22 slides on the fence 19. Rotation of lever 22 is prevented so that movement of lever 22 is more precisely limited to the x-x' and y-y' planes.

DESCRIPTION OF DRAWINGS TWO AND THREE

Referring to FIGS. 2 and 3. The variable speed V-belt transmission shown passes a drive from the crankshaft 44 of a vertical engine to the vertical inputshaft 76 of transaxle 1 over a range of ratios.

Driver sheave 31 is keyed to crankshaft 44 and has a fixed pitch diameter. Driven sheave 34 is keyed to transaxle inputshaft 76 and has an axially movable flange 34d that is spring biased toward a fixed flange 34e so that sheave 34 has a variable pitch diameter from 34c to 34b and is biased toward 34b. The exact construction of sheave 34 is shown typically in U.S. Pat. No. 4,088,036, Hillman.

A double sheave variator 40 has a first sheave 32 and a second sheave 33 separated by a common center flange 77 movable axially to alter the pitch diameters of sheaves 32 and 33 in inverse proportion. The construction of a variator of this type is described typically by Shaw, U.S. Pat. No. 2,235,122.

Variator 40 is rotably mounted on a spindle axle 42 which is made part of carrier member 37 rotatably mounted to the tractor chassis at pivot 38. A link rod 41 interconnects arm 37a of carrier member 37 with control lever 22 at 41a, so that a forward movement of lever 22 toward x' in the plane x-x' causes variator 40 to swing to the left of centerline 43; and a rearward movement of lever 22 from the position shown causes variator 40 to swing to the right of centerline 43.

A first V-belt 35 is reeved about sheaves 31 and 32 with proper slack to prevent power transfer when sheave 32 is at a maximum pitch diameter and when variator 40 is at a center neutral position as shown.

A second V-belt 36 is reeved about sheaves 33 and 34 with tension to bring sheave 33 to a minimum pitch diameter when sheave 34 is at an intermediate pitch diameter 34a and when variator 40 is at a neutral position as shown.

As the control lever 22 is moved forward toward x', the variator swings to the left on arc BC. When variator 40 reaches A the first belt 35 is tensioned to establish a drive and the second belt 36 is slackened just enough to move to a maximum pitch diameter 34b of sheave 34.

As the lever 22 is moved further and progressively to maximum x', the variator 40 swings progressively to C. Increased tension in belt 35 forces the common center flange 77 toward sheave 33 so that the overall reduction ratio between shafts 44 and 76 is progressively reduced.

As the variator 40 moves away from shaft 44, it moves toward shaft 76 at a disproportionate rate. Increased tension in belt 36 progressively brings sheave 34 to a pitch diameter 34c as variator 40 approaches C. The ratio range between shafts 44 and 76 is expanded beyond the range afforded by the variator 40 alone.

The spring biased variable sheave 34 replaces any belt tension maintenance means ordinarily associated with these V-belt transmissions.

An optional idler sheave 23 rotates on a fixed axis. As the variator 40 is moved toward C the idler sheave 23 presses against the belt 36 to increase the tension and thus force the belt 36 to progressively assume an even lesser pitch diameter at sheave 34. In this way the overall ratio range of the variable speed V-belt transmission is expanded to a greater extent. The idler sheave 23 can alternatively be carried on an arm of carrier member 37. As the carrier member 37 swings the variator 40 toward C, the arm would swing the idler sheave ever increasingly toward the belt 36 to provide an even greater range of ratio.

Now as control lever 22 is moved rearward toward x the variator 40 swings to the right of centerline 43. At A' the belt 35 is tensioned to establish a drive and the sheave 34 again assumes a 34b pitch diameter. As lever 22 is progressively moved further rearward to a maximum x, variator 40 swings progressively to B and reacts to increasing tension in belt 35 to decrease the reduction ratio between shafts 44 and 76. As the rearward movement of lever 22 is used in a reverse speed range, the variator 40 does not swing beyond B to hold a reverse speed to safe limit. With the variator 40 at B, the belt 36 barely moves inwardly from the maximum 34b pitch diameter at sheave 34.

When it is desirable to offer a wider range of ratios in reverse range, the linkage may be designed to swing the variator 40 beyond B and idler sheave means may be employed as described above.

In this FIGS. 2 and 3 example, the carrier member 37, pivot mounting 38 and arm 37a form a bellcrank, and serve to carry the spindle axle 42 over a center position (as drawn) to driving positions, to either side of said center position; so that, the control level 22 causes the V-belt transmission to engage and then advance as the lever 22 is moved either forwardly or rearwardly from a neutral position. The linkages and arms defined collectively are the "overcentering bellcrank means" referred to later.

Typically a clutch/brake pedal 8 (FIG. 7) is linked to return lever 22 and variator 40 to the neutral position when pedal 8 is depressed.

DESCRIPTION OF DRAWINGS FOUR AND FIVE

Referring to FIGS. 4 and 5. A variable speed V-belt transmission similar to that of FIGS. 2 and 3 is used to pass a drive from crankshaft 44 to transaxle 1 input shaft 76. French Pat No. 599,580 (Michael) and U.S. Pat. No. 2,689,484 (Phares) describe in detail a transmission of this type but lacking the new control means.

Driver sheave 31 and driven sheave 34' are keyed to their respective shafts and have fixed pitch diameters. A double sheave variator 40 (described above FIGS. 2 and 3) is rotatably mounted on spindle axle 42, which is made part of carrier member 37b, rotatably mounted to the vehicle chassis at pivot 38'. Referring now also to FIGS. 7 and 11, a vertical shift shaft 24, journalled in the vehicle chassis, ends with a welded arm 25 at the lower portion and ends with a dash panel located control lever 22b. A link rod 26 interconnects arm 25 with carrier member 37b, so that a forward movement of lever 22b in the plane x-x', toward x', causes variator 40 to swing away from shaft 44 and toward shaft 76 on an arc O-C'. A rearward movement of lever 22b toward x causes variator 40 to swing the same arc O-C'.

A first V-belt 35 is reeved about sheaves 31 and 32 with proper slack to prevent power transfer when sheave 32 is at a maximum pitch diameter and when variator 40 is at a forward neutral position O as drawn.

A second V-belt 36 is reeved about sheaves 33,34' properly tensioned by a rotatable idler sheave 27 mounted to an arm 28 pivoting at 30 and spring biased toward belt 36.

As the control lever 22b is moved forward toward x', the arm 25 swings to the left of centerline 43 to C on arc BC; and as lever 22b is moved rearward toward x, the arm 25 swings to the right of centerline 43 to B on arc BC. In response variator 40 swings first to A", where the V-belt 35 is tensioned sufficiently to establish a drive, and progresses to B' and then to C'. As variator 40 moves from A" to C' increased tension in V-belt 35 forces the common center flange 77 toward sheave 33; so that the overall reduction ratio between shafts 44 and 76 is progressively reduced to a minimum at C'.

Again, as the rearward movement of lever 22b is used in a reverse speed range, the swing of arm 25 to the right of centerline 43 is limited to B by gate means 46b to hold the variator 40 advancement to B' when operating in reverse range.

In this FIGS. 4–5 example, the arm 25, shaft 24 and control lever 22b comprise the "overcentering bellcrank means."

The vertical shaft 24 (FIG. 11) is free to slide axially some small distance in its journals so that this vertical movement in plane y-y' is used to engage a forward or reverse speed range at the transaxle 1. This vertical movement has little effect on variator 40.

Briefly, by way of example, the transaxle will be shifted as follows. A collar is rotatably mounted on shaft 24 at 24' in an axial fixed manner. A control cable has an outer housing secured to the chassis and an inner wire. A first end of this wire attaches to said collar and a second end attaches to transaxle shift arm 14 at a 14b position preferably. The rotatable collar prevents the wrapping of the wire as the lever 22b is moved in the x-x' plane. The transaxle shift arm 14 is spring 12 biased toward the forward drive position. A second spring would bias shaft 24 downwardly toward the forward drive position. Movement of the lever 22b upwardly toward y in the y-y' plane causes a pull in the inner wire and a shift to reverse at the transaxle 1. Gate means 46b (FIG. 7) hold lever 22b at y while lever 22b is advanced toward x in the reverse speed range. Said gate means 46b hold the lever 22b at y' (forward speed range) as lever 22b advances to x'. Friction means hold a desired lever 22b position in the x-x' plane.

The idler sheave means 27 may be replaced by other belt tensioning means such as that described in U.S. Pat. No. 3,777,585, Plamper and such as that described in FIGS. 2 and 3. The range of ratio provided by the V-belt transmission (FIGS. 4 and 5) can also be increased by employment of the variable sheave 34 (FIGS. 2 and 3). A rotatable idler sheave would swing on an arm motivated by the shift linkage FIGS. 4 and 5) to force belt 36 progressively to a lesser pitch diameter in the sheave 34 as the variator is advanced.

The linkage of example (FIGS. 4 and 5) may be used with the fender console shift lever 22 of FIGS. 1–3. The shaft 24 is replaced by a simple pivot mounting 38" as 38 (FIGS. 2 and 3). A second arm 78 is added to arm 25 to create a bellcrank. Arm 78 is interconnected to control lever 22 with link rod 41, so that forward or rearward movements of lever 22 from a neutral position and in the x-x' plane establish and then advance the FIGS. 4 and 5 V-belt transmission in forward or reverse speed ranges respectively. The arms 25 and 78 and pivot 38" now form the "overcentering bellcrank means."

DESCRIPTION OF DRAWINGS SIX AND EIGHT

Referring to FIGS. 6 and 8 primarily. A dash panel located control lever 22b is shown to control the V-belt transmission of FIGS. 2 and 3. Referring also to FIGS. 2 and 3, the arm 37a, lever 22 and link rod 41 are dismissed. The pivot mount 38 is more closely defined as a pivot shaft 38' journalled in the chassis at 79 with a welded carrier member 37 at a lower end. A snap ring 80 prevents axial movement of shaft 38'. Shaft 38' is coupled at 81 to a shift shaft 24a journalled in the chassis at 82; so that shafts 38' and 24a rotate as one; and so that shaft 24a is afforded a degree of axial (vertical) freedom. Now in this example, carrier member 37 and shafts 38' and 24a and lever 22b comprise the "overcentering bellcrank means."

The axial (vertical) displacements of shaft 24a are used to engage forward and reverse speed ranges at transaxle 1. While the simple and effective cable linkage described above with reference to FIG. 11 may be advantageously applied, an alternative transaxle shift linkage will be described here it detail.

A bellville spring 82 would bias shaft 24a axially downward (forward drive range). The transaxle shift arm 14 is spring 12 biased toward a forward drive position. A clevis and pin joint 81 connects control lever 22b and shaft 24a, so that shaft 24a rotates with lever 22b in the x-x' plane. Lever 22b has an extension 84 that contacts a fulcrum 85 on the tractor dash panel. Movement of lever 22b upwardly toward y forces shaft 24a to be displaced axially upward against spring 82 pressure. The gate means 46b holds lever 22b and thus shaft 24a at the y position (the reverse drive range) as lever 22b is advanced toward x.

A bellcrank 86 is free to swing on a fixed pivot 87 and includes an arm 88, slotted at 89, and an arm 90. A link rod 91 interconnects arm 90 with transaxle shift arm 14 at a location 14b (FIG. 1). A collar is rotatable journalled on shaft 24a at 92 in an axial fixed manner. A shoulder bolt 93 passes through slot 89 and is threaded into the collar at 92. With lever 22b located at y' as shown, the transaxle is shifted to a forward drive range and a forward movement of lever 22b toward x' establishes and then advances the V-belt drive.

When the lever 22b is moved upwardly to y the collar shoulder bolt 93 motivates bellcrank 86 to effect a shift at the transaxle 1 to a reverse speed drive. Then a rearward movement of lever 22b within the gate means 46b toward x establishes and then advances the V-belt drive in the reverse drive range.

DESCRIPTION OF DRAWING TEN

Referring to FIG. 10 primarily. The illustration shows the control lever 22a used at the alternative cowl location of FIG. 7.

A gate means at 46a (FIG. 7) limits the movement of lever 22a to a program as shown by gate means 46 (FIG. 1). Forward or rearward movement of lever 22a in the plane x-x' control the V-belt transmission in forward or reverse speed ranges respectively.

The lateral positioning of lever 22a to y and to y' engages reverse and forward respectively at the transaxle 1. Lateral movement of lever 22a within gate means 46a motivate a linkage similar to that shown in FIG. 1. A cable or bellcrank linkage would interconnect a fence means 19 (FIG. 1) with the transaxle shift arm 14 at 14b preferably.

The pivot shaft 7 is journalled to the tractor chassis at 7a, 7a'. The lever 22a may be made part of shaft 7 as drawn. A flattened spring section at 94 would allow the lever 22a to bend laterally to provide for the y-y' movement at a handle 95. A clevis and pin joint as 83 (FIG. 6) may be used to join lever 22a to shaft 7.

The welded arm 46 is used with the V-belt transmission of FIGS. 2 and 3. Referring also to FIGS. 2 and 3, the control lever 22 is dismissed. The link rod 41 now interconnects arm 37a with arm 46 to control the V-belt transmission as described above with FIGS. 2 and 3.

The arm 47 is used with the V-belt transmission of FIGS. 4 and 5. Referring to FIGS. 4, 5, 10 and 11, the lever 22b, shaft 24 and arm 25 are dismissed. The link rod 26 now interconnects carrier member 37b with arm 47. As the lever 22a is moved forwardly or rearwardly from a neutral position and in the x-x' plane, a drive is established and then advanced in forward or reverse speed ranges respectively. Now the lever 22a, shaft 7 and arm 47 comprise the "overcentering bellcrank means." Arm 47 is moved over a center horizontal plane to control the V-belt transmission of FIGS. 4 and 5.

The shift linkage means to interconnect the control lever 22, 22a, 22b and the transaxle shift means may well include electric switch and actuator means within the scope of the present invention. Typically the control lever 22, 22a, 22b will interact with electric switches located beneath the gate means 46 (FIG. 1). The appropriate switches will be opened or closed by the y-y' axis position of the control lever in a neutral channel 11 (FIG. 1) or at the threshold of a speed range channel 10 (FIG. 1). The electric circuits thus opened and closed energize and deenergize solenoid linear actuators (typically) to shift the transaxle/transmission to and from forward and reverse speed drive positions.

A spring may activate the tractor service brake with the control lever at neutral. An electromagnetic solenoid means will overpower this spring to provide fail safe automatic tractor braking.

Front wheel drive mowers may advantageously employ the small tractor invention disclosed as may other powered vehicles such as rollers and lift trucks. When these vehicles are defined as having front wheel drive, the terms forward and rearward used herein will apply equivalently to these vehicles. Any jack or intermediate shaft employed between the engine and sheave 31 is deemed equivalent to a vertical engine crankshaft.

I claim:

1. A drive mechanism for a small tractor and the like comprised of the combination of a variable speed ratio V-belt transmission and a forward and reverse gear transmission, said transmissions both being controlled by a single shift lever movable within a gate means generally parallel to the longitudinal axis of said tractor to control said V-belt transmission and movable within said gate means on a second axis generally perpendicular to said longitudinal axis to control said gear transmission, wherein a progressive forward movement of said lever from a neutral non driving position will establish and then advance said speed ratio of said V-belt transmission when said gear transmission is shifted to a forward travel drive, and wherein a progressive rearward movement of said lever from said neutral position will establish and then advance said speed ratio of said V-belt transmission when said gear transmission is shifted to a reverse travel drive, wherein said V-belt transmission comprises an intangible reference centerline on a reference plane, said centerline extending generally parallel to said longitudinal axis, and a driver sheave disposed forward generally on said centerline fixedly carried on the crankshaft of an engine, said crankshaft having an axis of rotation perpendicular to said reference plane, and a driven sheave disposed rearward generally on said centerline fixedly carried on the input shaft of said gear transmission, said input shaft having an axis of rotation perpendicular to said reference plane, and a double sheave variator comprised of a first sheave and a second sheave separated by a common center flange movable axially to alter the pitch diameters of said first and second sheaves in inverse proportion, said variator being disposed between said driver and driven sheaves and generally on said centerline when said V-belt transmission is in a neutral non driving state, and a generally stationary pivot mounting, and a carrier member having a spindle axle extending perpendicular to said reference plane and having a connection to said pivot mounting to permit movement of said spindle axle parallel to said reference plane and generally following an arc, said arc having a radius generally equal to the distance between said spindle axle and said pivot mounting, said variator being rotatably carried on said spindle axle, and a first friction drive V-belt reeved about said driver and first sheaves, and a second friction drive V-belt reeved about said second and driven sheaves, said single control lever being mounted near a base end in a manner to permit said forward and rearward movements and said second axis movement at a control handle end, and an overcentering bellcrank means to interconnect said lever and said carrier member converting said forward and rearward movements of said lever into displacements of said spindle axle following said arc so that as said variator is progressively caused to move, a drive is first established as said V-belts are tensioned and then advanced in speed ratio to a maximum as said variator reacts to changes in V-belt tension, said gear transmission comprised of a reversing drive train and a non-reversing drive train to establish said forward and reverse travel drives, and a selective shift means to make effective said reversing and nonreversing drive trains one only at a time, and shift linkage means to interconnect said lever and said selective shift means so that said second axis movement of said lever to prescribed positions within said gate means will cause said gear transmission to be shifted to said forward and reverse travel drives.

2. The drive mechanism of claim 1 wherein said selective shift means are sliding key shift means, said key being motivated by said second axis movement of said lever to make effective said reversing and nonreversing drive trains one only at a time.

3. The drive mechanism of claim 2 wherein said forward and reversing gear transmission is further comprised of a second forward travel drive train of extreme reduction ratio to provide a low speed forward operating range, said second forward travel drive being singularly established by said selective shift means so that said second axis movement of said lever to an additional prescribed position within said gate means will cause said gear transmission to be shifted to said second forward travel drive, and wherein a forward movement of said lever at said additional prescribed position within said gate means will establish and then advance said speed ratio of said V-belt transmission.

4. An improvement in a variable speed V-belt transmission, said transmission being comprised of; a driver sheave providing an input, a driven sheave providing an output, a double sheave variator disposed generally between said driver and driven sheaves and having first and second sheaves separated by a common center flange movable axially to alter the pitch diameter of said first and second sheaves in inverse proportion, a first V-belt reeved about said driver and first sheaves, a second V-belt reeved about said second and driven sheaves, a carrier member having a spindle axle on which said variator is rotatably carried, said carrier member being progressively and selectively movable at said spindle axle so that the center distance between said driver sheave and said variator is increased while the center distance between said variator and said driven sheave is decreased so that said first sheave is forced to assume a lesser pitch diameter in reaction to increased tension in said first V-belt and so that said second sheave must assume a greater pitch diameter in reaction to an axial displacement of said common center flange, said improvement being comprised of a second axially movable flange to variably alter the pitch diameter of said driven sheave, said second axially movable flange being spring biased toward a fixed flange of said driven sheave to bias a maximum pitch diameter, said improvement being further comprised of belt tensioning means to cause said second V-belt to be tensioned at a rate greater than said first V-belt as said variator is moved away from said driver sheave so that said second V-belt is forced to overcome said spring bias to progressively assume a lesser pitch diameter at said driven sheave and thereby increase the overall range of ratios of said transmission.

* * * * *